United States Patent [19]

Smith

[11] 3,887,913

[45] June 3, 1975

[54] ELECTRONIC STATUS AND CONTROL BOARD

[76] Inventor: Edwin W. Smith, 13073 Via Latina, Del Mar, Calif. 92014

[22] Filed: Apr. 15, 1974

[21] Appl. No.: 460,853

[52] U.S. Cl.............................. 340/381; 340/378 R
[51] Int. Cl................................................ G09f 9/14
[58] Field of Search................ 340/225, 381, 378 R; 179/1 SW, 1 B; 317/101

[56] References Cited
UNITED STATES PATENTS 3,766,550   10/1973   Vandemore ........................ 340/381

Primary Examiner—Harold I. Pitts
Attorney, Agent, or Firm—R. S. Sciascia; G. J. Rubens; T. M. Phillips

[57] ABSTRACT

A status control board which permits the assignment of communication system modules into a working configuration with a display of equipments available for assignment, equipment assigned and the configuration of the assigned equipment. Means are also provided to indicate failure of a configuration switch closure.

5 Claims, 3 Drawing Figures

ELECTRONIC STATUS AND CONTROL BOARD

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates to an electronic status and control board and more particularly to a system of using a status board to both visually represent desired interconnections of equipments as well as control such interconnections by remote switching.

A typical requirement for which the present invention is suited in the assignment of communication system modules into a working configuration, with a record or display of items available for assignment, items assigned, and manner of assignment; in addition it is desired that failure of the communication module be indicated and that failure of the configuration switch closure be indicated. A typical method at present employs preparation of a plan for a communications link employing certain assignable equipments; manual setting by the operator of manual switches located in various locations; or in some instances this may be done with alpha numeric instructions via a keyboard or a keyset instructing appropriate switch closures to effect the plan configuration. In the latter case, computer assistance is frequently used.

Limitations and disadvantages of existing methods include complexity and associated cost of computer hardware; complexity and associated cost of computer software, lack of a sufficient display capability to display all inventory items, all configurations, and status conditions simultaneously and in form easily correlated by non-technical users. Also there is difficulty in preparing a complex plan for configuration of connectable equipment and then actually initiating the plan without error.

SUMMARY OF THE INVENTION

The present invention provides a means whereby the configuration plan may be composed and displayed on a status display board of suitable size. Once composed and displayed as that configuration which is planned and desired, a means is provided to initiate and control the interconnections of the equipment directly from the status display board, ensuring implementation of interconnections in accordance with the plan. Expressed differently the status board display is employed to control the interconnections directly rather than a status display being prepared to reflect the condition of connections accomplished by other means. Although many variations of the invention are possible depending on the application and the associated equipment with which it is associated; it provides a graphic means by which a user can visualize his total available inventory of configurable items at any time, arranged in orderly manner, by groups or otherwise, to show such categories as "Good Spare", "Bad Spare", "Spare Under Repair", "Unit in Use", etc; it provides a graphic means, assisting the user to plan the configurations he wishes to execute, with the ability to arrange visually the pictorial representations of the equipments he proposes to configure; it provides the means, following the pictorial planning of the configuration proposed, of quickly controlling the connections or disconnections between the units pictorially displayed in a configuration; it provides the means for the user of associating easily indications of malfunctions reported for units or groups of equipment configured; it provides the means of quickly controlling a pre-check of a configuration prior to use and relating visually the results of such a check to the particular configuration visually displayed; it provides small or larger display surfaces which can be suitably back or front illuminated, on which basic and supplementary information regarding the equipment items can be displayed; it provides memory capability for items available, configuration planned, configuration executed, items in use, and the like; it provides a display area closely associated with each item tab posted permitting feedback of information to provide information regarding operating conditions and parameters of that item (mode, frequency, error-rates, etc.); it provides a means of graphically planning, modifying, and controlling a configuration; it also provides a display of items configured by other data entry means, lending itself to automatic checking for discrepancies between the configuration requested and the configuration implemented; it provides the means of displaying the activity or non-activity (traffic or message utilization) of a given configuration through use of indicators closely associated with the configuration strings or with the component equipment items; it provides the means of showing to the viewer in the entirety all inventory items and conditions of use or availability at any time, without necessity for printing out repetitively new lists as conditions change; it provides a simple means of preventing attempts to assign the same items to different configurations, since an equipment tab removed from the inventory grouping and used in a configuration no longer is in the inventory grouping. Alternative systems require the repetitive printing out of new lists, sometimes quite lengthy, to reveal the items remaining for assignment; and the invention lends itself to modular design and growth, with an accompanying growth in orderly manner of display board size and the related controls. Hence the information is usable with either few or many configurable items.

Since the invention incorporates a scanning operation, generating from the movable tabs the basic data instructions required, it is not required that unique positions on the board be reserved for particular tabs or configurations. It is only required that tabs to direct a given configuration be placed in sequence. The scanning action will then generate the required data instructions for switch closures regardless of vertical or horizontal positioning of the total configuration grouping. Furthermore, because of the scanning operation, two or more different configurations may be composed along the same horizontal coordinate, if space permits, since only the sequence of data generated by scanning is important, and not the particular line or time associated with the scanning. In the generation of the basic data it should be noted that the data for a switch closure is generated by the combination of data corresponding to the separate data from adjacent halves or connections depicted by adjacent tabs. Identification of equipment items are uniquely specified by the data message carried on a single tab.

OBJECTS OF THE INVENTION

Accordingly, an object of the invention is the provision of a system using a status board to both visually represent desired interconnections of equipments as well as control such interconnections by remote switching.

Other objects and many of the attendant advantages of this invention will be readily appreciated as the same becomes better understood by reference to the following detailed description when considered in connection with the accompanying drawings.

DESCRIPTION OF THE PREFERRED EMBODIMENTS

Figure 1:
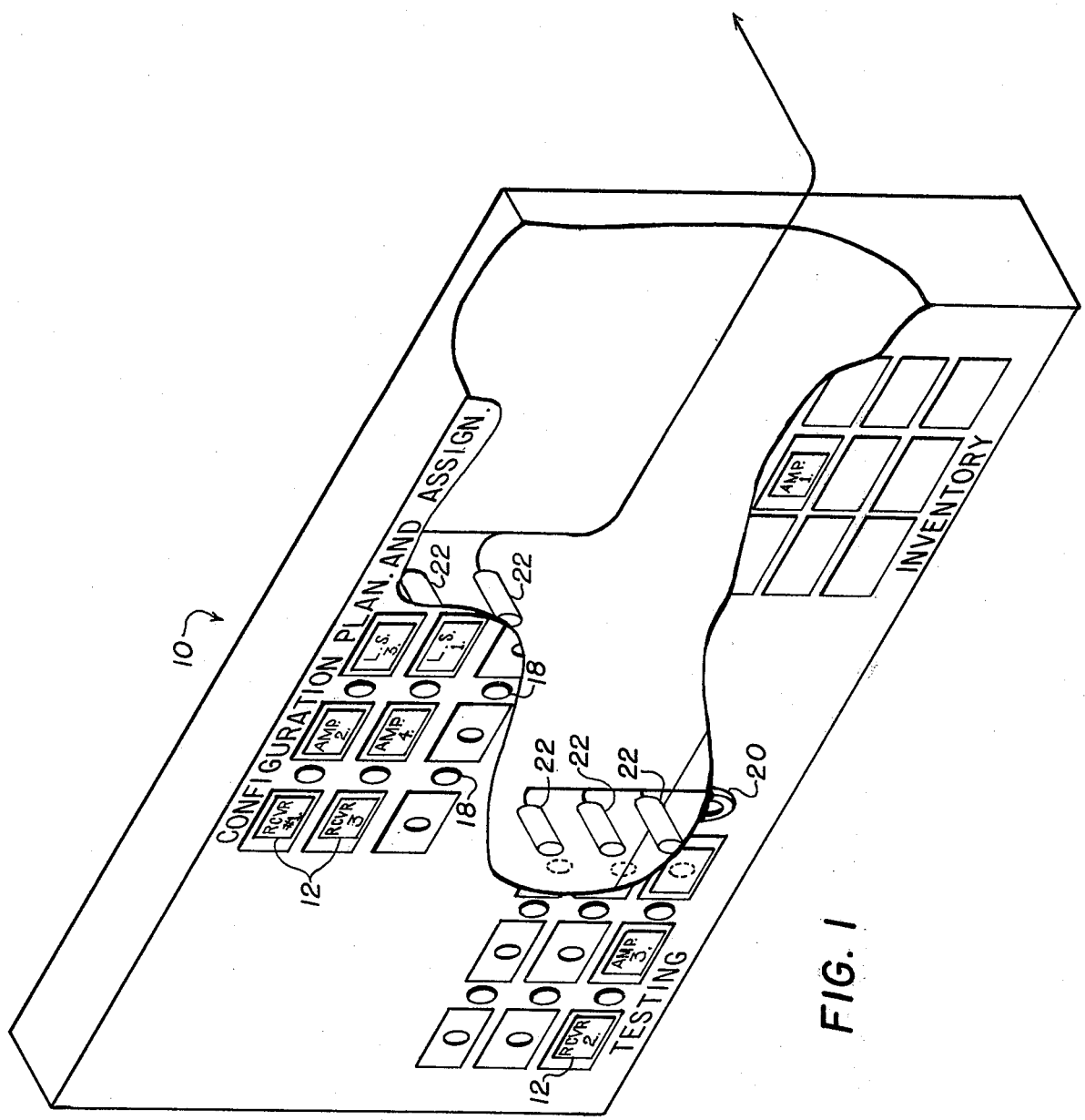
FIG. 1 is a cutaway pictorial view of the status and control board.

Referring now to the drawings wherein there is shown in FIG. 1 a display board 10 on which display tabs 12 can be conveniently attached and arranged in any configuration desired. It is desired to assign communication modules into configuration strings employing modules of various types available for assignment. For example, let it be assumed that there are a number of receivers, a number of audio amplifiers and a number of loud speakers. Let it further be assumed that a receiver can be connected to any amplifier and that an amplifier can be connected to any loud speaker through suitable remotely controlled switchboards. As can be seen on the display board there is space for positioning the various components to arrive at the desired configuration. This configuration is shown schematically in FIG. 2.

Figure 3:
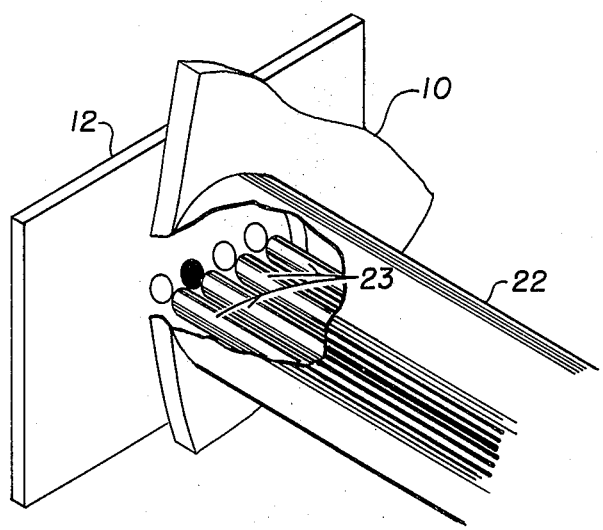
FIG. 3 shows one of the tabs representing equipment on the board of FIG. 2.
Figure 2:
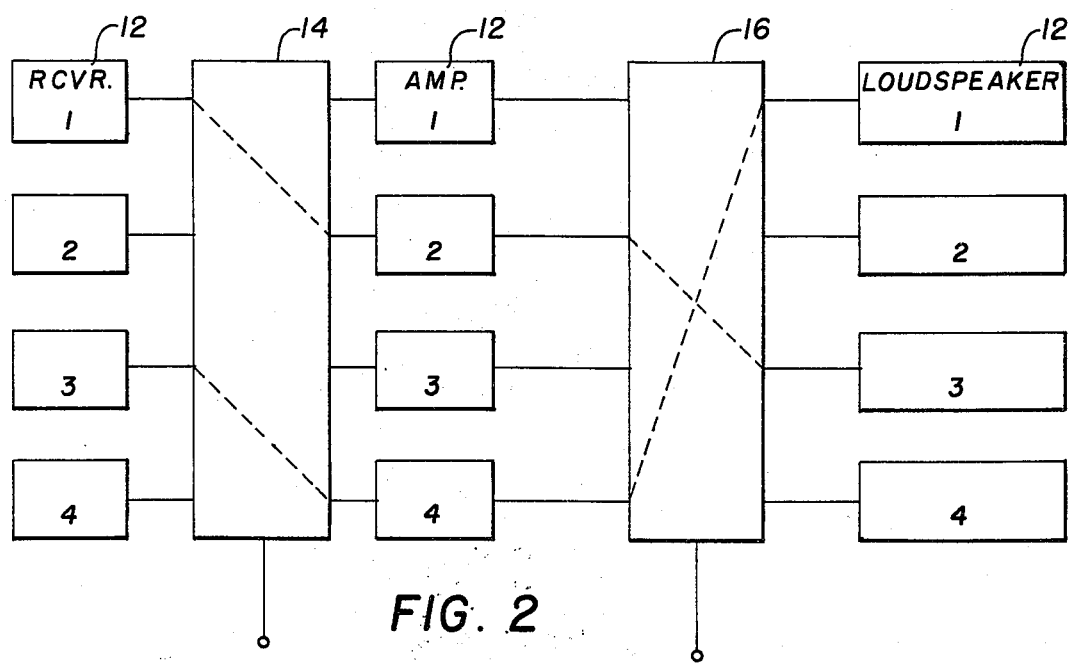
FIG. 2 is a block diagram showing various equipment interconnections in keeping with the teachings of the invention.

In the example shown in FIG. 2, it is proposed to connect receiver No. 1 to amplifier No. 2 and it is proposed to connect amplifier No. 2 to loudspeaker No. 3. Furthermore, as depicted by the arrangement on the second horizontal line, it is proposed to connect receiver No. 3 to amplifier No. 4 and it is proposed to connect amplifier No. 4 to loudspeaker No. 1. The actual connections are made by the remote switches 14 and 16 in response to an input signal received from control board 10. Control signals are generated by closure of pushbutton switch 18 which causes an information sensing element 22 to read the code on back of the tabs 12. As shown in FIG. 3, the information sensing element 22 is shown as a photocell reading device consisting of a plurality of photocells 23 which are aligned with the dots that make up the code on the back of tab 12.

Tabs 12 may be positioned in either of the three display areas. It can then be seen that if the tabs 12 are moved from the inventory area to the configuration area then it is immediately obvious to an operator that that particular equipment is no longer available for assignment. In addition to providing the basic functions of inventory display, inventory assignment configuration planning, configuration execution, and configuration display, the present invention provides a basis for correlated display and control of additional attributes related to the various components assigned to a configuration network. For example a configuration connection as shown in FIG. 2 when requested to be effected is indicated as completed by utilization of appropriate feedback signals from switches 14 and 16 to pushbutton indicator lights to be illuminated. Failure of the connection, once pushbutton 18 is closed, can cause the indicator button or lamp to flash providing an alarm to the user that a desired connection has failed. Similarly, by moving the tabs from the inventory area to the testing area, malfunctions of equipment will be indicated. An indicator 20 can be used to indicate such a malfunction. As indicated above each is represented by a corresponding tab which carries coding unique to a particular unit or equipment, hence the display area occupied by a particular unit or piece can be uniquely identified and addressed with suitable circuitry because of the association of the piece with that space. This is so because a complete scan of the status board and pieces can be made to produce the coded information revealing the connection requested and also the physical location of a particular piece at the time of scan.

Obviously many modifications and variations of the present invention are possible in the light of the above teachings. It is therefore to be understood that within the scope of the appended claims the invention may be practiced otherwise than as specifically described.

What is claimed is:

1. An electronic status and control board comprising:
   a. a configuration area where coded tabs representing equipments to be configured into a system are positioned to display a desired system configuration,
   b. sensing means for sensing the code of said coded tabs to provide selective switching signals,
   c. actuating means positioned on the control board to activate said sensing means to generate selective switching signals to implement the assigned equipments in the desired configuration.

2. The status control board of claim 1 further comprising an inventory area for storing said coded tabs so that when a tab is removed it will be obvious to an operator that the equipment represented by the tab is no longer available for assignment.

3. The status control board of claim 1 further comprising a testing area where said tabs may be positioned and the equipment represented by the tabs may be tested for operating condition.

4. The status and control board of claim 1 wherein said actuating means includes an indicating means to indicate when the equipment is properly connected into the system and when there is a malfunction of the equipment.

5. The status and control board of claim 1 wherein said sensing means is a photocell reading device.

* * * * *